(12) United States Patent
Ajiki

(10) Patent No.: US 11,519,366 B2
(45) Date of Patent: *Dec. 6, 2022

(54) CANISTER

(71) Applicant: FUTABA INDUSTRIAL CO., LTD., Aichi (JP)

(72) Inventor: Shogo Ajiki, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 91 days.

This patent is subject to a terminal disclaimer.

(21) Appl. No.: 17/104,614

(22) Filed: Nov. 25, 2020

(65) Prior Publication Data

US 2021/0199071 A1 Jul. 1, 2021

(30) Foreign Application Priority Data

Dec. 27, 2019 (JP) .............................. JP2019-239612

(51) Int. Cl.
*F02M 33/02* (2006.01)
*F02M 25/08* (2006.01)
*B01D 53/04* (2006.01)

(52) U.S. Cl.
CPC ..... *F02M 25/0854* (2013.01); *B01D 53/0415* (2013.01); *B01D 53/0446* (2013.01); *B01D 2253/102* (2013.01); *B01D 2257/708* (2013.01); *B01D 2259/4516* (2013.01)

(58) Field of Classification Search
CPC .......... F02M 25/0872; B01D 2253/102; B60K 2015/03236; B60K 15/03504
See application file for complete search history.

(56) References Cited

U.S. PATENT DOCUMENTS

| 7,922,797 | B2 | 4/2011 | Kosugi et al. |
| 8,440,005 | B2 * | 5/2013 | Lang .................. F02M 25/0854 96/126 |
| 10,221,812 | B2 | 3/2019 | Iwamoto |
| 10,495,031 | B2 * | 12/2019 | Omichi .................... H05B 3/18 |
| 11,092,115 | B2 | 8/2021 | Ajiki et al. |

(Continued)

FOREIGN PATENT DOCUMENTS

| CN | 111089024 A | 5/2020 |
| JP | S6131170 Y2 | 9/1986 |

(Continued)

OTHER PUBLICATIONS

Notice of Reasons for Refusal dated Oct. 26, 2021 for corresponding Japanese Application No. 2019-239612.

(Continued)

*Primary Examiner* — John Kwon
(74) *Attorney, Agent, or Firm* — David D. Brush; Westman, Champlin & Koehler, P.A.

(57) ABSTRACT

A canister includes a filling chamber and an internal structure. The filling chamber is filled with activated carbon. The internal structure includes a first component and a second component that are arranged in the filling chamber. The first component is located at a position that is different from a position of the second component in a flow direction of an evaporated fuel in the filling chamber and is positioned such that at least a portion thereof does not overlap in position with the second component when projected onto a plane perpendicular to the flow direction.

8 Claims, 12 Drawing Sheets

(56) References Cited

U.S. PATENT DOCUMENTS

| | | | | |
|---|---|---|---|---|
| 2009/0266236 A1* | 10/2009 | Kosugi | ............ | B01D 53/0415 |
| | | | | 96/108 |
| 2012/0234301 A1* | 9/2012 | Takamatsu | ......... | F02M 25/0854 |
| | | | | 123/519 |
| 2018/0163671 A1 | 6/2018 | Iwamoto | | |
| 2020/0124004 A1* | 4/2020 | Ajiki | ................. | F02M 25/0872 |
| 2021/0115634 A1* | 4/2021 | Saadatmanesh | .......... | E04C 5/07 |

FOREIGN PATENT DOCUMENTS

| | | |
|---|---|---|
| JP | 2008240683 A | 10/2008 |
| JP | 2009264273 A | 11/2009 |
| JP | 2018096254 A | 6/2018 |

OTHER PUBLICATIONS

Second Office Action dated Sep. 28, 2022 for related Chinese Application No. 202011549676.8.
Office Action dated May 7, 2022 for related Chinese Application No. 202011549676.8.

\* cited by examiner

L1 > L2

L1 > L2

L1 > L2

CANISTER

CROSS-REFERENCE TO RELATED APPLICATIONS

This application claims the benefit of Japanese Patent Application No. 2019-239612 filed on Dec. 27, 2019 with the Japan Patent Office, the entire disclosure of which is incorporated herein by reference.

BACKGROUND

The present disclosure relates to a canister.

A canister, which inhibits release of an evaporated fuel into the atmosphere, is attached to a fuel tank of a vehicle. The canister adsorbs the evaporated fuel to activated carbon, desorbs fuel from the activated carbon with aspirated air for purging, and supplies the purged fuel to an engine.

The activated carbon used for the canister is formed into a pellet shape or a granular shape, filled in a filling chamber of the canister, and pressurized with a spring or the like to reduce an occurrence of a clearance. Japanese Unexamined Patent Application Publication No. 2018-096254 (JP2018-096254) discloses a configuration in which bar members are arranged in a filling chamber for the purpose of reducing ventilation resistance in the canister.

SUMMARY

The configuration disclosed in JP2018-096254 greatly reduces ventilation resistance in the vicinity of outer-circumferential surfaces of the bar members. However, the ventilation resistance is not reduced in areas distanced from the bar members. As a result, a utilization efficiency of the activated carbon is poorer in the areas distanced from the bar members relative to a utilization efficiency of the activated carbon in areas in the vicinity of the bar members. Thus, there is a room for further improvement of the utilization efficiency of the activated carbon filled in the canister.

In one aspect of the present disclosure, it is desirable to provide a canister that can improve the utilization efficiency of the activated carbon.

One aspect of the present disclosure is a canister that adsorbs and desorbs an evaporated fuel generated in a fuel tank of a vehicle. The canister comprises a filling chamber and an internal structure. The filling chamber is filled with activated carbon. The internal structure comprises a first component and a second component that are arranged in a space in the filling chamber that is filled with the activated carbon. The first component is located at a position that is different from a position of the second component in a flow direction of the evaporated fuel in the filling chamber and is positioned such that at least a portion of the first component does not overlap in position with the second component when projected onto a plane perpendicular to the flow direction.

The above-described configuration forms an area where a filling density of the activated carbon is small in the vicinity of respective surfaces of the first component and the second component (hereinafter, also referred to as internal component(s)) located in the filling chamber. The area having a small filling density reduces ventilation resistance and thus facilitates flow of the evaporated fuel. Thus, the above-described arrangement of the internal components forms the following areas in line in the flow direction of the evaporated fuel: an area (hereinafter, referred to as sparse area) that facilitates the flow of the evaporated fuel; and an area (hereinafter, referred to as dense area) that is distanced from the surfaces of the internal components and discourages the flow of the evaporated fuel relative to the former area. Consequently, the evaporated fuel, which has flowed through the sparse area, easily flows into the dense area, thus improving a utilization efficiency of the activated carbon in the dense area. Accordingly, a utilization efficiency of the entire activated carbon filled in the filling chamber can be improved.

In the above-described canister, the first component and the second component each may have a plate-shape. Such a configuration can increase a specific surface area of each internal component, thus widely forming the sparse area and inhibiting a filling amount of the activated carbon from being limited.

In the above-described canister, the first component and the second component each may include a portion that has a longer length in the flow direction relative to a length in a direction perpendicular to the flow direction. Such a configuration allows the internal component to be arranged such that a longitudinal axis thereof extends along the flow direction, thus inhibiting the flow of the evaporated fuel from being discouraged due to the internal component.

In the above-described canister, the above-described first component and second component each may have a cross-shaped section in the plane perpendicular to the flow direction. Such a configuration can form the sparse area in a wider range in the filling chamber.

In the above-described canister, at least one of the above-described first component or second component may comprise a restriction that projects toward an inner wall surface forming the filling chamber, to thereby limit a movement range of the above-described internal structure in a direction that intersects the flow direction. Such a configuration can inhibit the internal structure from moving in a wide range in the filling chamber, thus inhibiting breakage of the activated carbon as a result of the activated carbon and the internal structure colliding with each other.

In the above-described canister, the above-described first component and second component may be configured as an integrated member. With such a configuration, it is sufficient to arrange the integrated member in placing the first component and the second component in the filling chamber, thus simplifying a manufacturing process of the canister.

In the above-described canister, the above-described first component and second component may be arranged adjacent to each other in the flow direction. Such a configuration forms an adjacent area as the sparse area, thus significantly reducing the ventilation resistance.

In the above-described canister, the internal structure may further comprise at least one component in addition to the above-described first component and second component. Furthermore, at least a portion of the above-described at least one component may be located at a position that is different from the respective positions of the first component and the second component in the flow direction of the evaporated fuel in the filling chamber. And, the above-described at least one component may be positioned such that at least a portion thereof does not overlap in position with at least one of the first component or the second component when projected onto the plane perpendicular to the flow direction. Such a configuration can reduce the ventilation resistance using the at least one component as with the first component and the second component.

Here, it should be noted that the above-described positional difference between the first component and the second component in the flow direction includes the following arrangements: an arrangement in which the respective positions of the first component and the second component do not overlap with each other in the flow direction; and an arrangement in which the respective positions of the first component and the second component partially overlap with each other in the flow direction.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. First Embodiment 1-1. Overall Configuration

Figure 1:
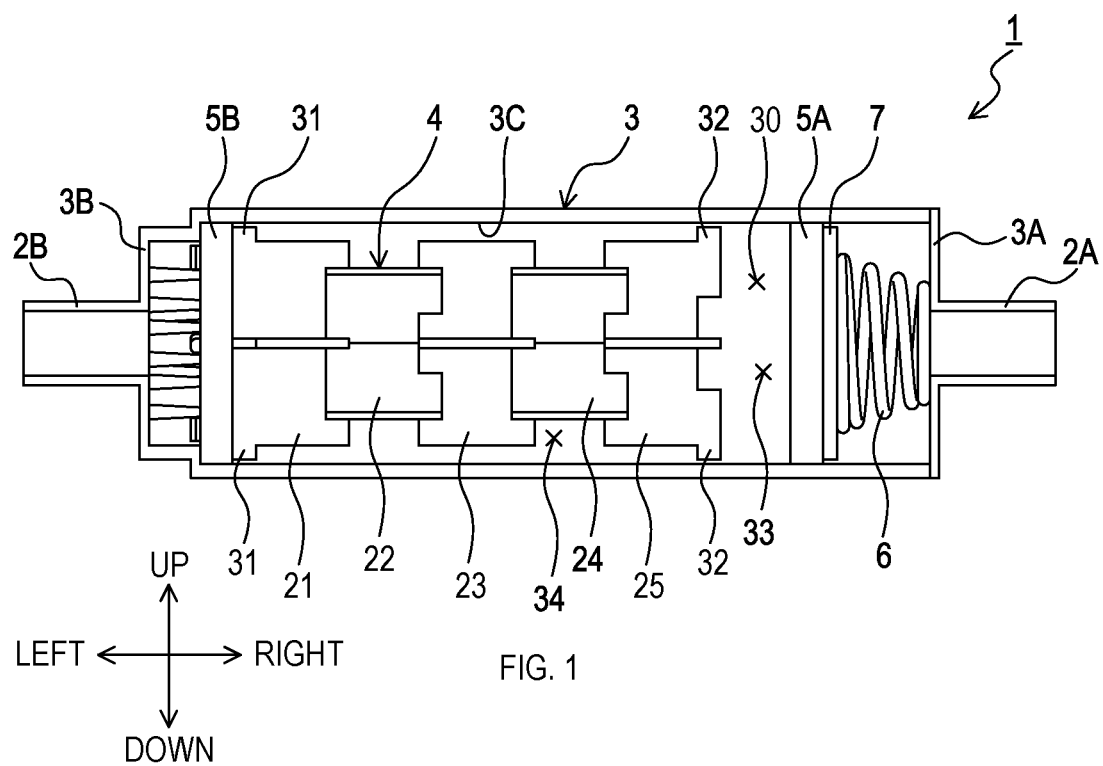
FIG. 1 is a front view of a canister of a first embodiment with a filling chamber and a port shown in a cross-section.
Figure 2:
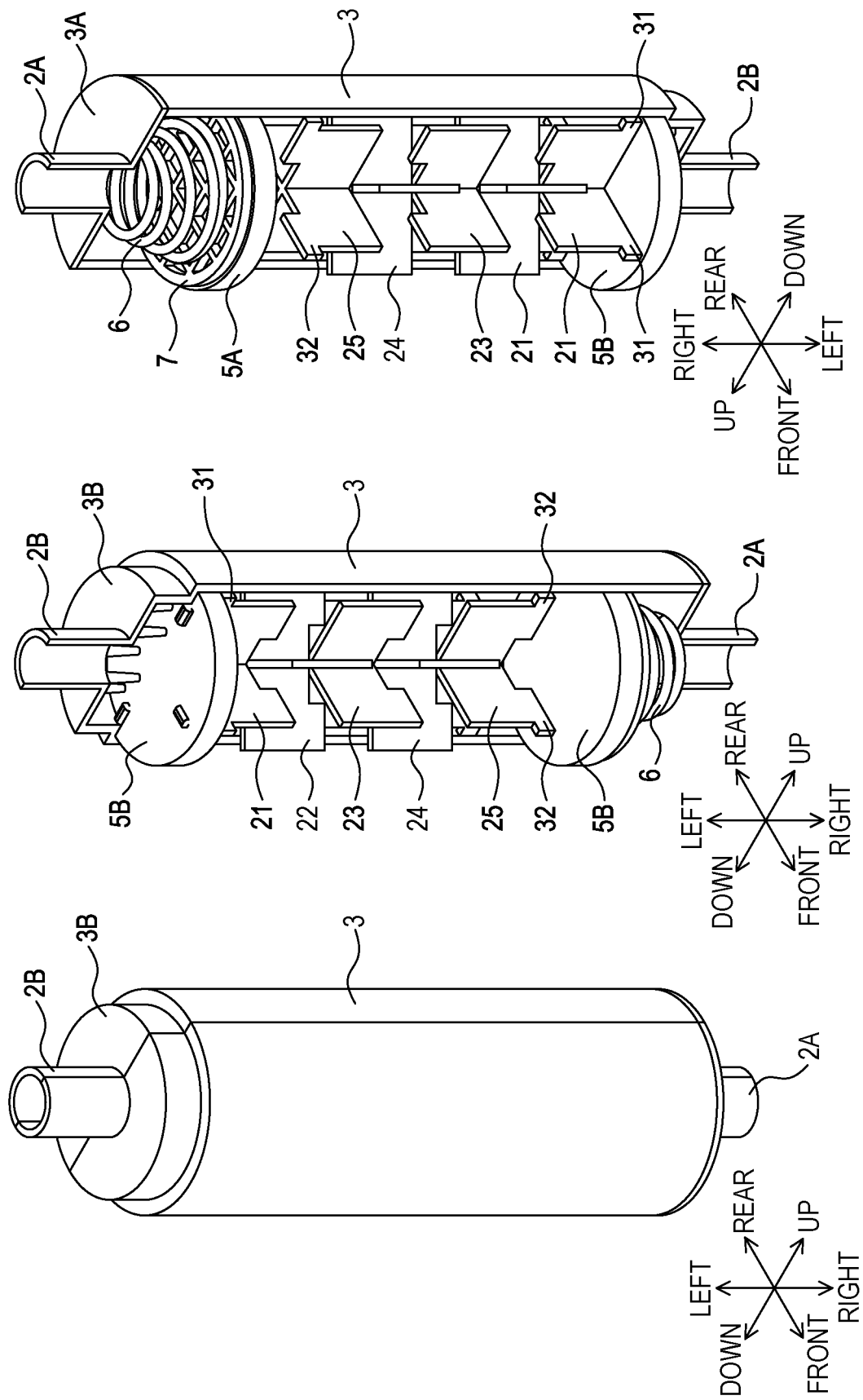
FIG. 2A is a perspective view of the canister of the first embodiment.
FIG. 2B is a perspective view showing the filling chamber and the port in a cross-section.
FIG. 2C is a perspective view of the canister from a view different from that of FIG. 2B.

A canister 1 shown in FIG. 1 and FIGS. 2A to 2C adsorbs and desorbs an evaporated fuel generated in a fuel tank of a vehicle. The canister 1 comprises a charge port 2A, an atmosphere port 2B, a filling chamber 3, an internal structure 4, a first filter 5A, and a second filter 5B. The canister 1 is filled with activated carbons. Illustration of the activated carbons is omitted for easy explanation.

1-2. Port

The charge port 2A is connected to the fuel tank of the vehicle via a piping. The evaporated fuel, which is generated in the fuel tank, is taken into the filling chamber 3 through the charge port 2A.

The atmosphere port 2B is connected to a drain filter or the like via a piping to be opened to the atmosphere. The atmosphere port 2B releases, into the atmosphere, gas from which the evaporated fuel has been removed. Furthermore, the atmosphere port 2B takes in external air (that is, purge air) to desorb (that is, purge) the evaporated fuel adsorbed in the filling chamber 3.

Although it is not shown, the canister 1 further comprises a purge port. The purge port is connected to an intake pipe of an engine of the vehicle via a purge valve. The purge port releases the evaporated fuel contained in the filling chamber 3 from the filling chamber 3 and supplies the evaporated fuel to the engine.

The atmosphere port 2B is located at a position opposite to the charge port 2A and the purge port across the filling chamber 3. However, an arrangement of each port is not limited to the above-described position.

In the description below, a direction where the charge port 2A is located is defined as a right direction, a direction where the atmosphere port 2B is located is defined as a left direction, and directions perpendicular to the right direction and the left direction are defined as a front-rear direction and an up-down direction. These definitions of the directions are used to easily describe a shape of the canister, and not to limit the configuration and embodiments of the canister.

1-3. Filling Chamber

The filling chamber 3 has a space that is filled with the activated carbons to adsorb the evaporated fuel taken from the charge port 2A. The evaporated fuel adsorbed by the activated carbons in the filling chamber 3 is released from the purge port.

The filling chamber 3 is a hollow tubular body that extends in a right-left direction. In one example, the filling chamber 3 has a cylindrical shape. However, the shape of the filling chamber 3 is not limited to the cylindrical shape. The filling chamber 3 may be, for example, a tubular body having a quadrangle shape, oval shape, or various other shapes in a cross-section.

At the end in the right direction of the filling chamber 3, a first bottom wall 3A is provided and, at the end in the left direction of the filling chamber 3, a second bottom wall 3B is provided. The charge port 2A and the purge port are connected to the first bottom wall 3A. The atmosphere port 2B is connected to the second bottom wall 3B.

The first filter 5A is located inside the first bottom wall 3A of the filling chamber 3. The second filter 5B is located inside the second bottom wall 3B. The activated carbons are filled in a space between the first filter 5A and the second filter 5B of the filling chamber 3.

Each of the first filter 5A and the second filter 5B is configured not to allow the activated carbons to pass through, but to allow the evaporated fuel to pass through. Also, between the first filter 5A and the first bottom wall 3A, an elastic body 6 is provided. The elastic body 6 urges a grid 7 and the first filter 5A in the left direction. The elastic body 6 is a spring. The grid 7 allows the evaporated fuel to pass through.

The first bottom wall 3A is separated from a tubular main body of the filling chamber 3 before the filling chamber 3 is filled with the activated carbons. The process of filling the filling chamber 3 with the activated carbons may include inserting an internal structure 4 into the filling chamber 3, introducing the activated carbons with the right end of the canister 1 facing up, and fixing the first bottom wall 3A to the tubular main body of the filling chamber 3 by welding or the like.

In the filling chamber 3, the evaporated fuel flows in the right-left direction between the atmosphere port 2B and the charge port 2A while being in contact with the activated carbons and passing through an activated carbon layer. As described above, the right-left direction is a flow direction in which the evaporated fuel flows.

In the filling chamber 3, specifically in a space 30 that is filled with the activated carbons, the internal structure 4 is arranged. The internal structure 4 controls the flow of the evaporated fuel. The space 30 is a space enclosed by the first filter 5A and the second filter 5B.

1-4. Internal Structure (i) Configuration of Internal Structure

Figure 3:
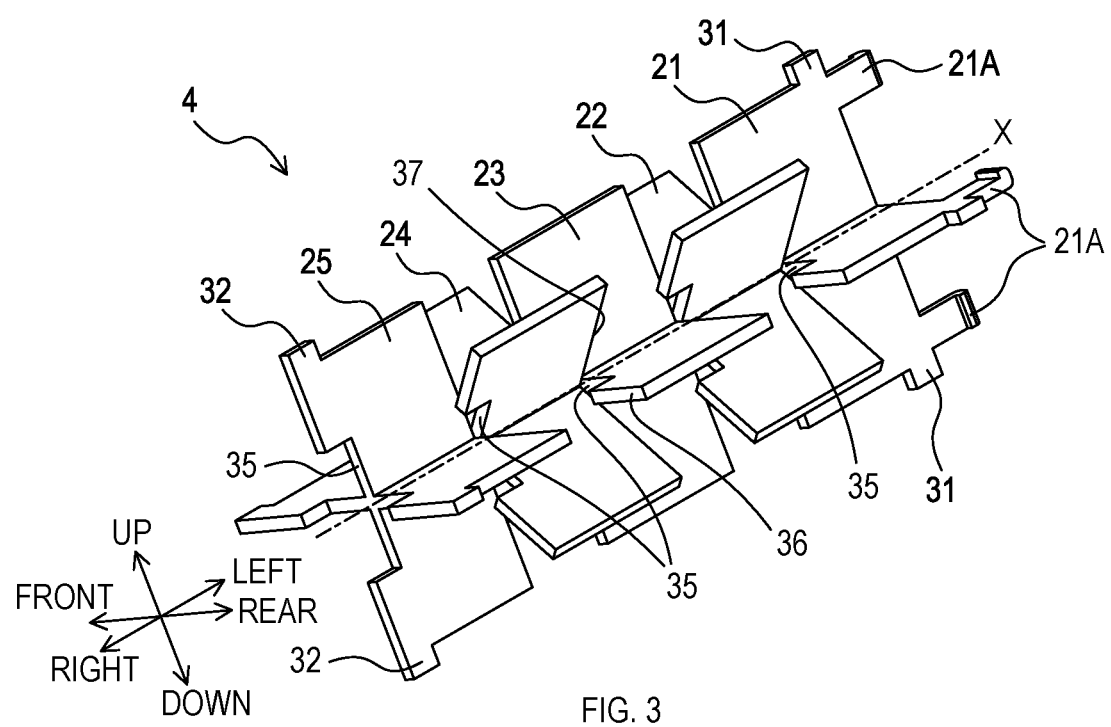
FIG. 3 is a perspective view of an internal structure of the first embodiment.

As shown in FIG. 3, the internal structure 4 comprises five internal components: a first internal component 21, a second internal component 22, a third internal component 23, a fourth internal component 24, and a fifth internal component 25. In the description below, these five internal components are also referred to as "internal components" altogether. Furthermore, when one of the internal components is described without particularly identifying which one is referred, such an internal component is simply described as "internal component". A combination of specific two internal components corresponds to a combination of a first component and a second component, which will be described in details later.

The internal components 21 to 25 each comprise a plate-shaped member that has a cross-shaped section in a plane perpendicular to the flow direction and has a width in the flow direction. That is, each of the internal components 21 to 25 is formed into a shape in which two plates intersect perpendicularly. In other words, the internal components 21 to 25 each comprise four plate-shaped members that extend in four directions from a reference axis X extending along the flow direction. In the description below, the plane perpendicular to the flow directions is also referred to as "perpendicular plane". The perpendicular plane is a virtual plane that extends in the up-down direction and the front-rear direction.

The internal components 21 to 25 are arranged in line in the flow direction. Thus, the internal components 21 to 25 are located at respective different positions in the flow direction in the filling chamber 3. A right end of each of the internal components 21 to 25 is provided with a recess 35 that is recessed in the left direction at the center thereof in the up-down direction and the front-rear direction. Of two internal components that are adjacent to each other in the flow direction, one internal component located at the right side partially enters the recess 35 of the other internal component located at the left side. Consequently, the two internal components, which are adjacent to each other in the flow direction, are arranged to partially overlap with each other in the flow direction. That is, in the first embodiment, the adjacent internal components in the flow direction being located in respective different positions in the flow direction means that the two adjacent internal components in the flow direction are located at the respective different positions that are partially different from each other in the flow direction.

The arrangement of the two adjacent internal components will be described with reference to the third internal component 23 and the fourth internal component 24 of FIG. 3 on the assumption that the evaporated fuel flows from left to right. A downstream end 36 is located in the most downstream side of the internal component 23 in the flow direction. An upstream end 37 is located in the fourth internal component 24, which is located downstream of the third internal component 23. In the two adjacent internal components, the upstream end 37 is located upstream of the downstream end 36 that is located in the most downstream side of the third internal component 23. The downstream end 36 and the upstream end 37 may be located at the same position in the flow direction, and/or the upstream end 37 of the fourth internal component 24 may be located at the same position, in the flow direction, as a second downstream end (for example, a recessed bottom of the recess 35) of the third internal component 23. The upstream end 37 may be located upstream of the second downstream end.

Figure 4A:
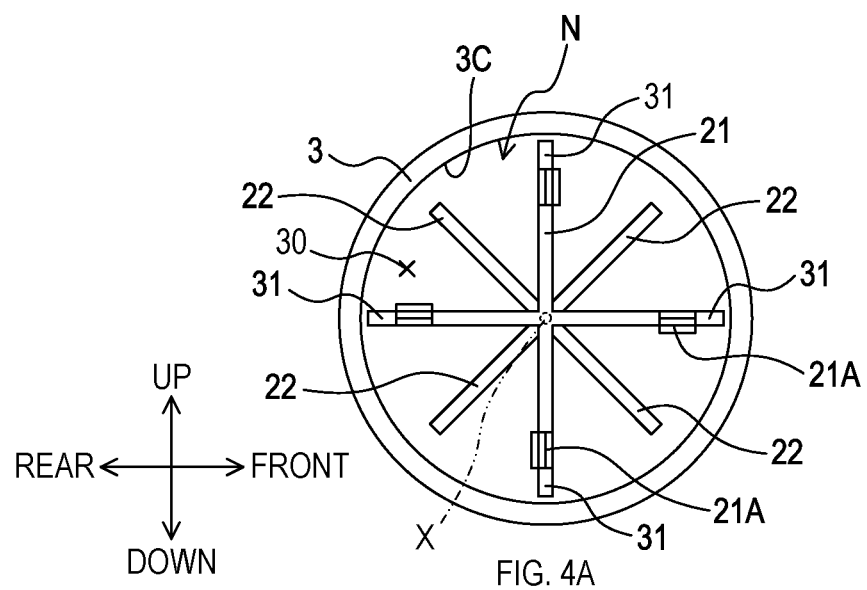
FIG. 4A is a schematic sectional left view showing an arrangement of the internal structure and the filling chamber of the first embodiment.
Figure 4B:
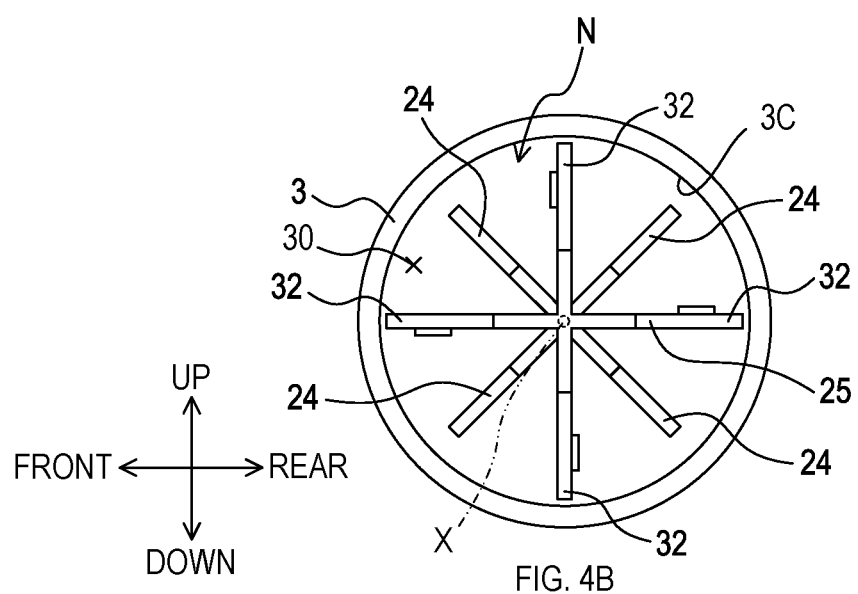
FIG. 4B is a schematic sectional right view showing the arrangement of the internal structure and the filling chamber of the first embodiment.

The two adjacent internal components among the internal components 21 to 25 are positioned not to at least partially overlap in position with each other (at a position N) when projected onto the above-described perpendicular plane. As shown in FIG. 4A, the first internal component 21 is oriented at an angle of 45 degrees about the reference axis X with respect to the second internal component 22. Furthermore, as shown in FIG. 4B, the fourth internal component 24 is oriented at an angle of 45 degrees about the reference axis X with respect to the fifth internal component 25. In this way, the internal components 21 to 25 each are oriented at an angle of 45 degrees with respect to its adjacent internal component. Accordingly, at least two internal components among the internal components 21 to 25 are positioned not to at least partially overlap in position with each other when projected onto the plane perpendicular to the flow direction.

The first internal component 21 is located at a position that is different from a position of the second internal component 22 in the flow direction of the evaporated fuel in the filling chamber 3. Furthermore, the first internal component 21 is positioned such that at least a portion of the first internal component 21 does not overlap in position with the second internal component 22 when projected onto the plane perpendicular to the flow direction. The first internal component 21 and the second internal component 22 correspond to the first component and the second component; however, the combination of the first component and the second component is not limited to the combination of the first internal component 21 and the second internal component 22. For example, the first internal component 21 and the fourth internal component 24 also correspond to the first component and the second component in the same manner. Furthermore, the second internal component 22 and the third internal component 23 also correspond to the first component and the second component in the same manner. In other words, two internal components that satisfy the above-described positional relation correspond to the first component and the second component.

The first internal component 21 includes ends that are adjacent to an internal wall surface 3C forming an internal space of the filling chamber 3 and each of these ends is provided with a restriction 31 that protrudes toward the internal wall surface 3C. The above-described end is, in other words, an outer edge of each of the four plate-shaped members extending from the reference axis X. The four restrictions 31 contact the internal wall surface 3C to thereby limit a movement range of the internal structure 4 in a direction that intersects the above-described flow direction. The direction intersecting the flow direction includes the up-down direction and the front-rear direction. There may be or may not be a small gap formed between each of the four restrictions 31 and the internal wall surface 3C. Furthermore, the fifth internal component 25 includes four ends that are adjacent to the internal wall surface 3C and the four ends are also provided with restrictions 32 that are similar to the restrictions 31.

In addition, the first internal component 21 is provided with four projections 21A, and these projections 21A fix the second filter 5B to the first internal component 21.

(ii) Flow of Evaporated Fuel

When the filling chamber 3, which is provided with the above-described internal structure 4, is filled with the activated carbons therein, a relatively large gap is generated between the activated carbons in the vicinity of a surface of the internal structure 4. This decreases the filling density of the activated carbons on the surface of the internal structure 4 and in its adjacent area, which results in decrease in ventilation resistance in the area. Consequently, an area that facilitates flow of the evaporated fuel (hereinafter, referred to as sparse area) is generated in an area in the vicinity of each of the internal components 21 to 25. In contrast, an area distanced from surfaces of the internal components has a high filling density of the activated carbons and thus has an increased ventilation resistance. As a result, an area that discourages the flow of the evaporated fuel (hereinafter, referred to as dense area) relative to the sparse area is generated.

In the internal structure 4, the internal components 21 to 25 are located at the respective different positions in the flow direction, and the adjacent internal components are positioned not to at least partially overlap in position with each other when projected onto the perpendicular plane. For this reason, the sparse area and the dense area are located in line in the flow direction. For example, the evaporated fuel, which flows in the right direction along the surface of the first internal component 21, travels toward right to the position in which the second internal component 22 is located and thereafter enters a portion in the filling chamber 3 that is distanced from the surface of the second internal component 22 and has a high filling density of the activated carbon. In this way, the dense area is located downstream of the sparse area in the flow direction and the sparse area is located downstream of the dense area in the flow direction.

(iii) Other Features

As shown in FIG. 1, the internal structure 4 is formed to be sufficiently shorter than a length of the inside of the filling chamber 3 along the right-left direction, which thus creates a space 33 between the internal structure 4 and the first filter 5A. The space 33 contains the activated carbons. Furthermore, a gap 34 is formed between the internal wall surface 3C of the filling chamber 3 and an outer edge of the internal structure 4 excluding the restrictions 31 and the restrictions 32. The internal components 21 to 25 are fixed to each other and therefore, the internal structure 4 is configured as an integrated member.

1-5. Effects

The first embodiment detailed above can bring the following effects.

(1a) In the canister 1, the internal structure 4 alternately forms the sparse area and the dense area in the filling chamber 3 in the flow direction. Consequently, the evaporated fuel, which has flowed through the sparse area, is encouraged to flow into the dense area, thereby enhancing a utilization efficiency of the activated carbons in the dense area. This reduces imbalance between flow paths through which the evaporated fuel passes, thereby improving a utilization efficiency of the entire activated carbons filled in the filling chamber 3.

(1b) The internal components 21 to 25, which are provided to the internal structure 4, each are formed by assembling the plate-shaped members. Due to the plate-shapes, the internal components 21 to 25 each have a large specific surface area. As a result, it is possible to form the sparse area widely and to inhibit a filling amount of the activated carbons from being reduced. The adjacent internal components have respective areas that overlap with each other in the flow direction. Therefore, the sparse areas are formed close to each other, thereby decreasing the ventilation resistance.

(1c) The internal components 21 to 25, which are provided to the internal structure 4, each are configured such that the plate-shaped members extend in the direction substantially parallel to the flow direction. Furthermore, the internal components 21 to 25 each include a portion that has a longer length in the flow direction relative to a length in the direction perpendicular to the flow direction. In this way, the internal components are arranged such that longitudinal axes of the internal components 21 to 25 coincide with the flow direction, thereby inhibiting the flow of the evaporated fuel from being discouraged by the internal components 21 to 25.

(1d) The internal components 21 to 25, which are provided to the internal structure 4, each have the cross-shaped section. This allows the sparse area to be formed widely in the filling chamber 3.

(1e) The internal structure 4 comprises the four restrictions 31 and the four restrictions 32. These restrictions can inhibit the internal structure 4 from moving in the filling chamber 3.

(1f) The gap 34 is formed between the internal structure 4 and the internal wall surface 3C. Thus, when the canister 1 vibrates as a result of vibration of the vehicle, for example, it is possible to inhibit the internal structure 4 from greatly vibrating and consequently to inhibit breakage of the activated carbon.

(1g) In a state where the filling chamber 3 is filled with the activated carbons, the space 33 is formed rightward of the internal structure 4. This allows an area, where the first filter 5A can be present, to be widened in the right-left direction. Thus, even if a filling amount of the activated carbons varies, or even if the activated carbons are gradually stuffed on the left side due to use of the canister 1, the first filter 5A can be inhibited from being in contact with the internal structure 4. Consequently, it is possible to inhibit lack of pressure to the activated carbons caused by abutment of the first filter 5A with the internal structure 4, and to impart stable pressure to the activated carbons by the elastic body 6.

(1h) In the canister 1, the internal components 21 to 25, which form the internal structure 4, are configured as an integrated member. Thus, in an assembling process of the canister 1, it is sufficient to arrange the single internal structure 4 in the filling chamber 3, thus simplifying the manufacturing process.

2. Second Embodiment

2-1. Difference from First Embodiment

As compared to the canister of the first embodiment, a canister of a second embodiment is different only in respect of the positions of the ports of the filling chamber and the shape of the internal structure. Therefore, descriptions of common configurations are omitted, and different configurations will be mainly described. The same reference numeral used in the first embodiment denotes the same configuration, and reference should be made to the preceding description.

Figure 5:
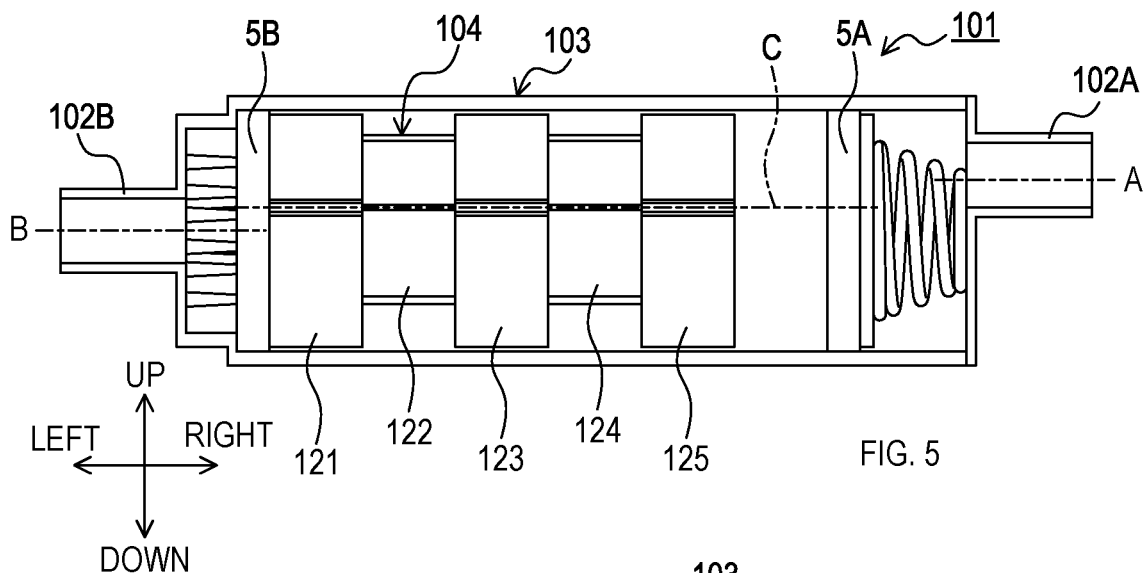
FIG. 5 is a front view of a canister of a second embodiment with a filling chamber and a port shown in a cross-section.
Figure 6:
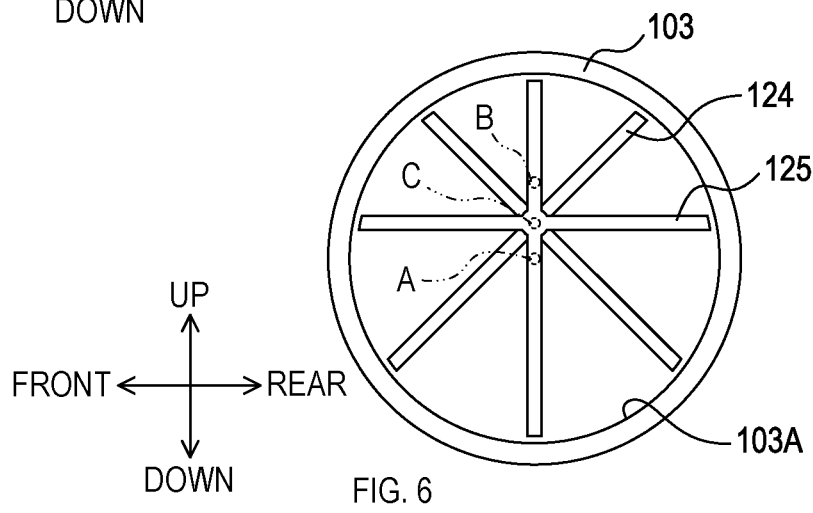
FIG. 6 is a schematic sectional view showing an arrangement of an internal structure and the filling chamber of the second embodiment.
Figure 7:
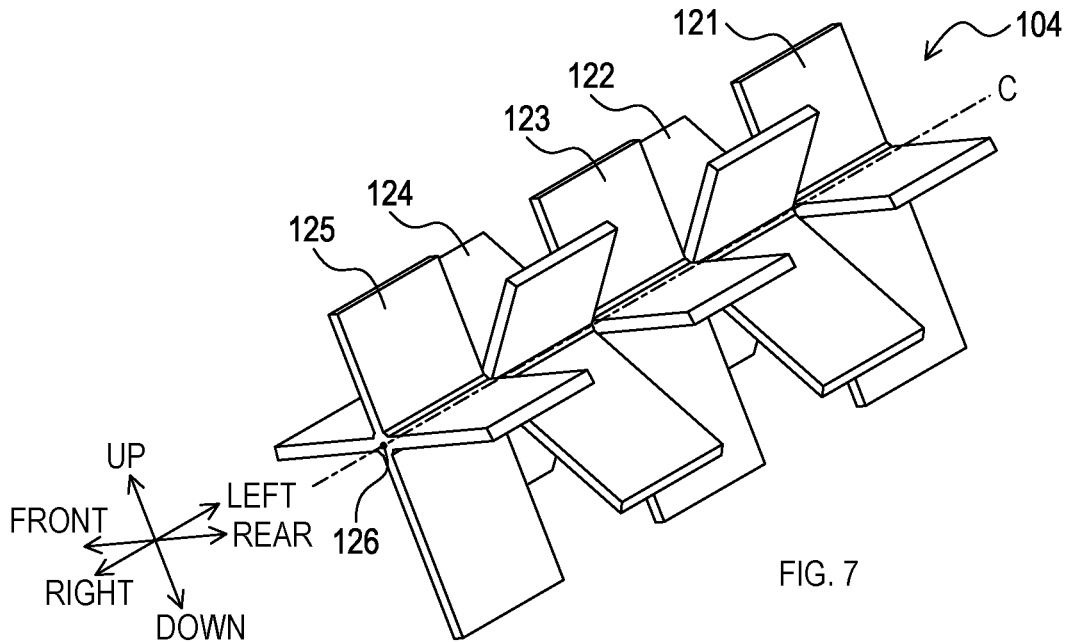
FIG. 7 is a perspective view of the internal structure of the second embodiment.

FIG. 5 shows a canister 101 of the second embodiment. The canister 101 comprises an internal structure 104 in a space in a filling chamber 103 that is filled with the activated carbons. The filling chamber 103 is different from the filling chamber 3 of the first embodiment in that a central axis A of the charge port 2A and a central axis B of the atmosphere port 2B are located at respective different positions in the up-down direction. As shown in FIGS. 6 and 7, the internal structure 104 comprises a first internal component 121, a second internal component 122, a third internal component 123, a fourth internal component 124, and a fifth internal component 125. As in the internal structure 4 of the first embodiment, these internal components 121 to 125 each are shaped such that two plates are perpendicular to each other. Unlike the internal structure 4, however, a reference axis C is not positioned in the centroid of the filling chamber 103, and plate-shaped members extending downward are relatively longer as compared to plate-shaped members extending upward. Moreover, as shown in FIG. 5, the reference axis C is located at a position that is different from both the position of the central axis A and the position of the central axis B in the up-down direction.

2-2. Effects

According to the second embodiment detailed above, the internal structure 104 comprises a configuration corresponding to the internal structure 4 and therefore, the same effects as the above-described effects (1a) to (1d) and (1h) of the first embodiment can be obtained. Furthermore, the internal structure 104 can reduce imbalance in utilization efficiency of the activated carbons filled in the filling chamber 103. Thus, even if the positions of the ports are deviated from the center of the filling chamber 103, it is possible to inhibit reduction in the utilization efficiency of the activated carbons.

3. Third Embodiment

3-1. Difference from First Embodiment

As compared to the canister of the first embodiment, a canister of a third embodiment is different only in respect of the shape of the internal structure. Therefore, descriptions of common configurations are omitted, and different configurations will be mainly described. The same reference numeral used in the first embodiment denotes the same configuration, and reference should be made to the preceding description.

Figure 8:
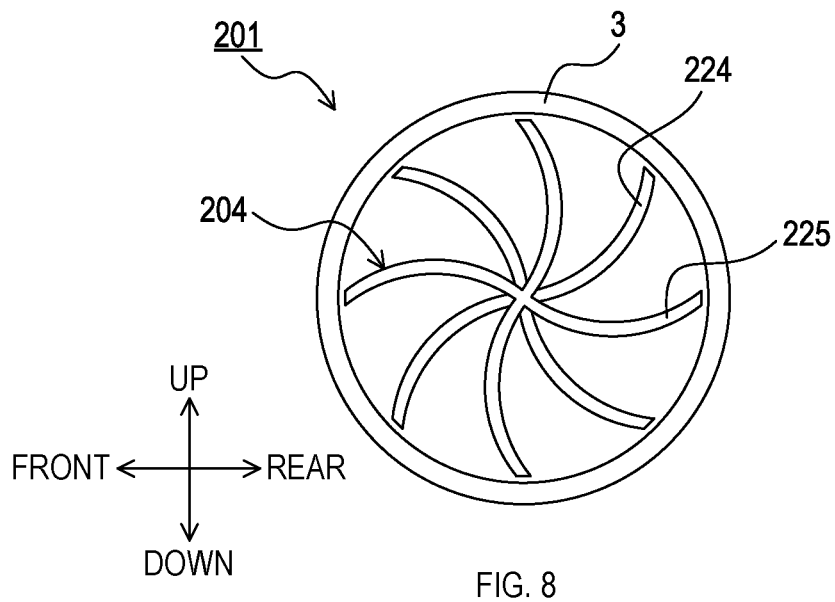
FIG. 8 is a schematic sectional view of a canister of a third embodiment.
Figure 9:
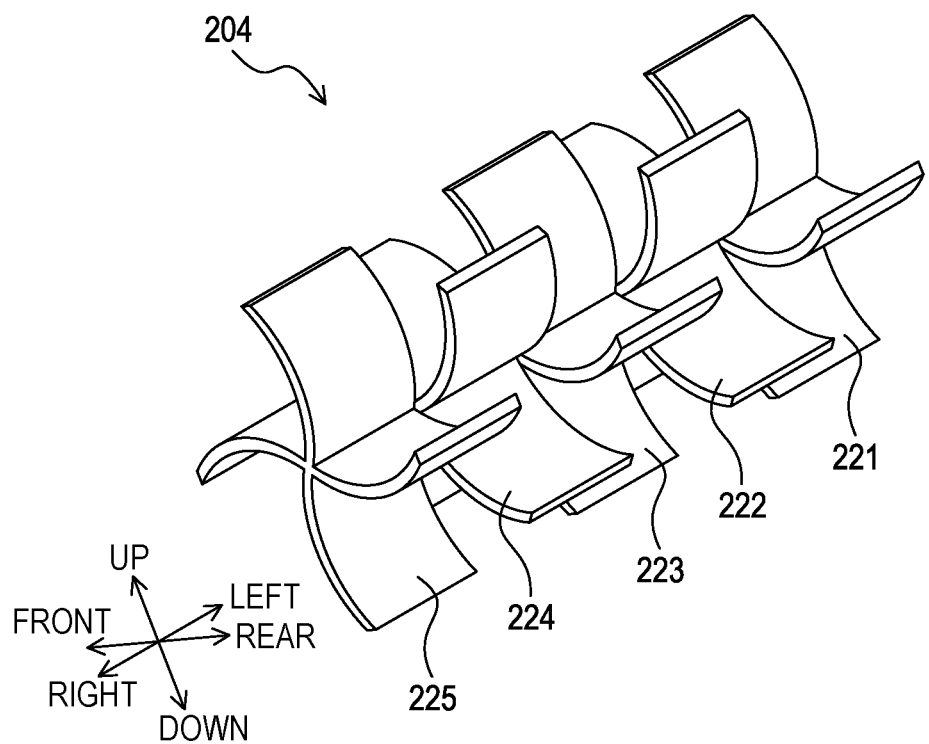
FIG. 9 is a perspective view of an internal structure of the third embodiment.

As shown in FIGS. 8 and 9, a canister 201 of the third embodiment comprises an internal structure 204 in the space in the filling chamber 3 that is filled with the activated carbons. The internal structure 204 comprises a first internal component 221, a second internal component 222, a third internal component 223, a fourth internal component 224, and a fifth internal component 225.

The internal components 221 to 225 are shaped such that two plate members are combined. Each plate member has a S-shaped section in the perpendicular plane and has a width in the flow direction. As compared to the internal components of the first embodiment, the internal components of the third embodiment are different in that each internal component is curved instead of being flat. The internal components 221 to 225 are located at respective different positions in the right-left direction, which is the flow direction of the evaporated fuel. As is apparent from FIG. 8, the internal components 221 to 225 each are positioned such that the majority of each plate member excluding a portion positioned in the centroid of the filling chamber 3 does not overlap in position with its adjacent internal component when projected onto the perpendicular plane.

3-2. Effects

According to the third embodiment detailed above, the internal structure 204 comprises a configuration corresponding to the internal structure 4 and therefore, the same effects as the above-described effects (1a) to (1c) and (1h) of the first embodiment can be obtained. Furthermore, the internal components 221 to 225 each have a curved plate-shape, but have a substantially cross-shaped section. Therefore, the third embodiment exhibits the same effect as the effect (1d) of the first embodiment.

4. Fourth Embodiment

4-1. Difference from First Embodiment

As compared to the canister of the first embodiment, a canister of a fourth embodiment is different only in respect of the shape of the internal structure. Therefore, descriptions of common configurations are omitted, and different configurations will be mainly described. The same reference numeral used in the first embodiment denotes the same configuration, and reference should be made to the preceding description.

Figure 10:
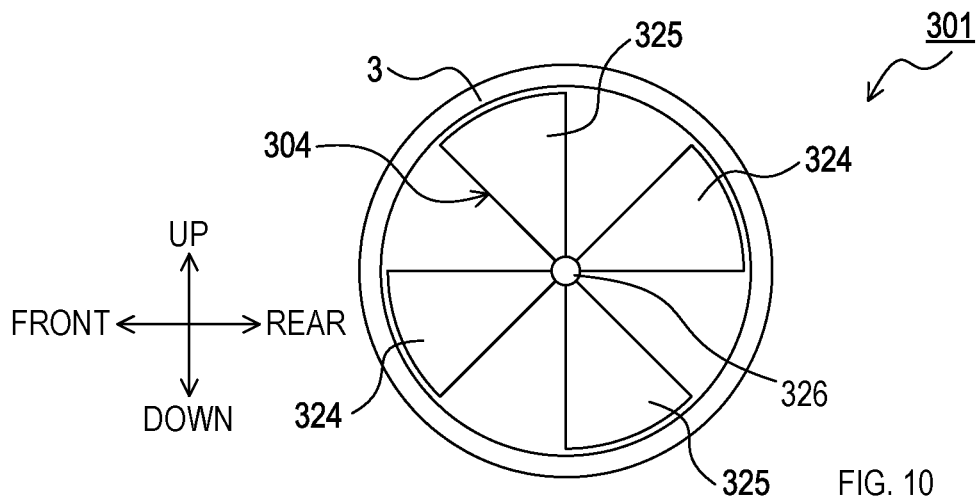
FIG. 10 is a schematic sectional view of a canister of a fourth embodiment.
Figure 11:
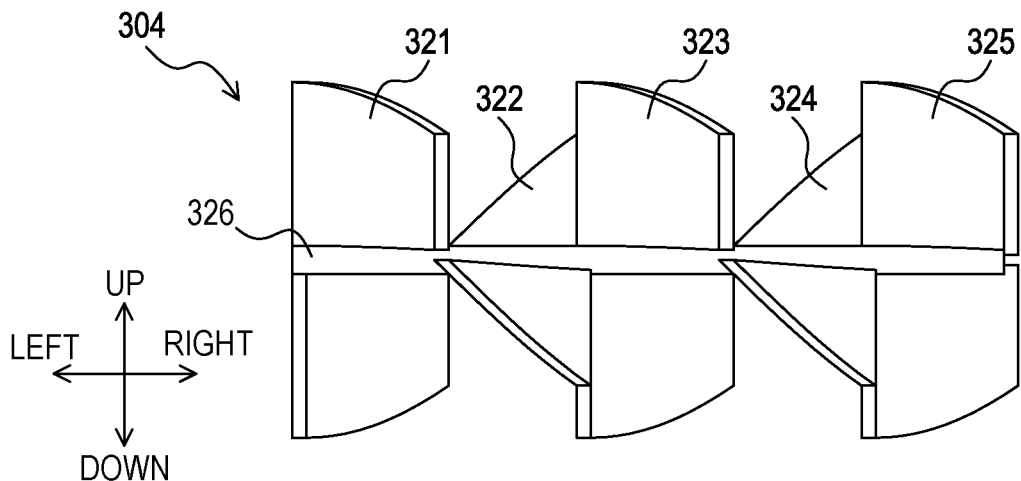
FIG. 11 is a front view of an internal structure of the fourth embodiment.
Figure 12:
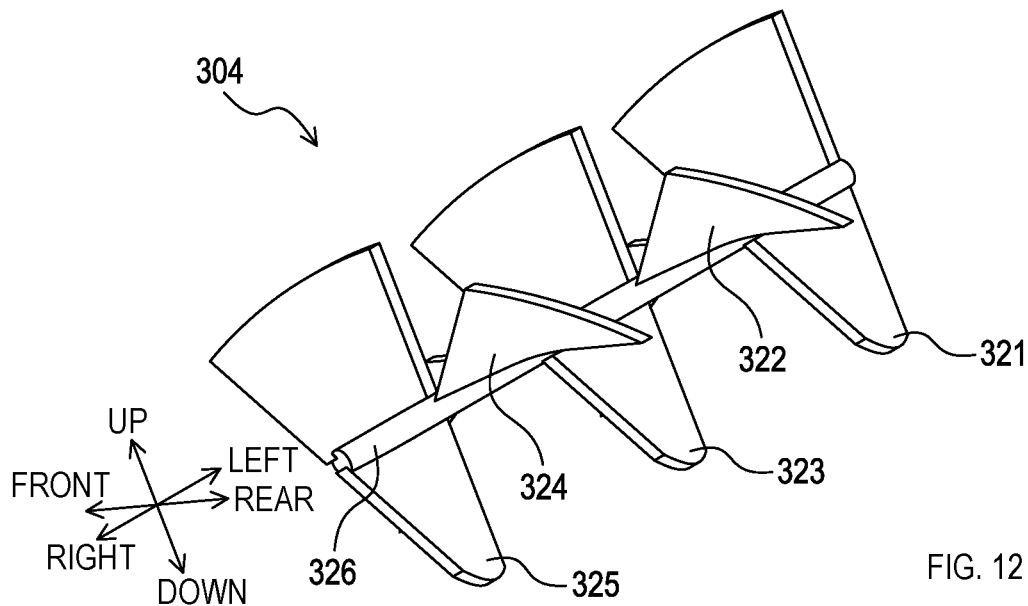
FIG. 12 is a perspective view of the internal structure of the fourth embodiment.

As shown in FIGS. 10 to 12, a canister 301 of the fourth embodiment comprises an internal structure 304 in the space in the filling chamber 3 that is filled with the activated carbons. The internal structure 304 comprises a first internal component 321, a second internal component 322, a third internal component 323, a fourth internal component 324, and a fifth internal component 325. Furthermore, the canister 301 comprises a shaft member 326 that extends in the right-left direction.

Each of the internal components 321 to 325 includes paired plate-shaped pieces that extend in opposing directions from the shaft member 326. Each plate-shaped piece is formed into a twisted plate shape such that a portion thereof coupled to the shaft member 326 has a length in the flow direction, whereas a leading end thereof extending from of the shaft member 326 intersects the flow direction. In other words, each plate-shaped piece has a so-called propeller shape.

The internal components 321 to 325 are located at respective different positions in the right-left direction, which is the flow direction of the evaporated fuel. Furthermore, as is apparent from FIGS. 10 and 12, each of the internal components 321 to 325 is positioned such that at least a portion thereof does not overlap in position with its adjacent internal component when projected onto the perpendicular plane.

4-2. Effects

According to the fourth embodiment detailed above, the internal structure 304 comprises a configuration corresponding to the internal structure 4 and therefore, the same effects as the above-described effects (1a) to (1b) and (1h) of the first embodiment can be obtained.

5. Fifth Embodiment 5-1. Difference from First Embodiment

As compared to the canister of the first embodiment, a canister of a fifth embodiment is different only in respect of the shape of the internal structure. Therefore, descriptions of common configurations are omitted, and different configuration will be mainly described. The same reference numeral used in the first embodiment denotes the same configuration, and reference should be made to the preceding description.

Figure 13:
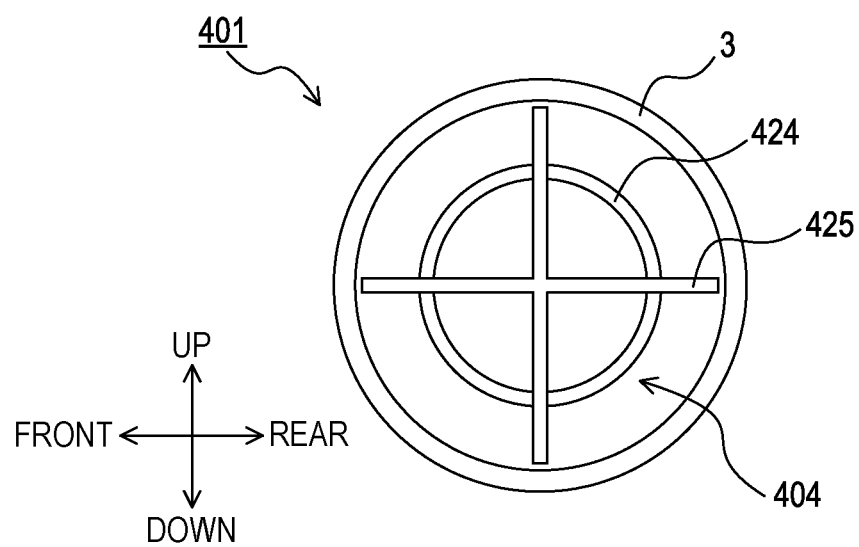
FIG. 13 is a schematic sectional view of a canister of a fifth embodiment.
Figure 14:
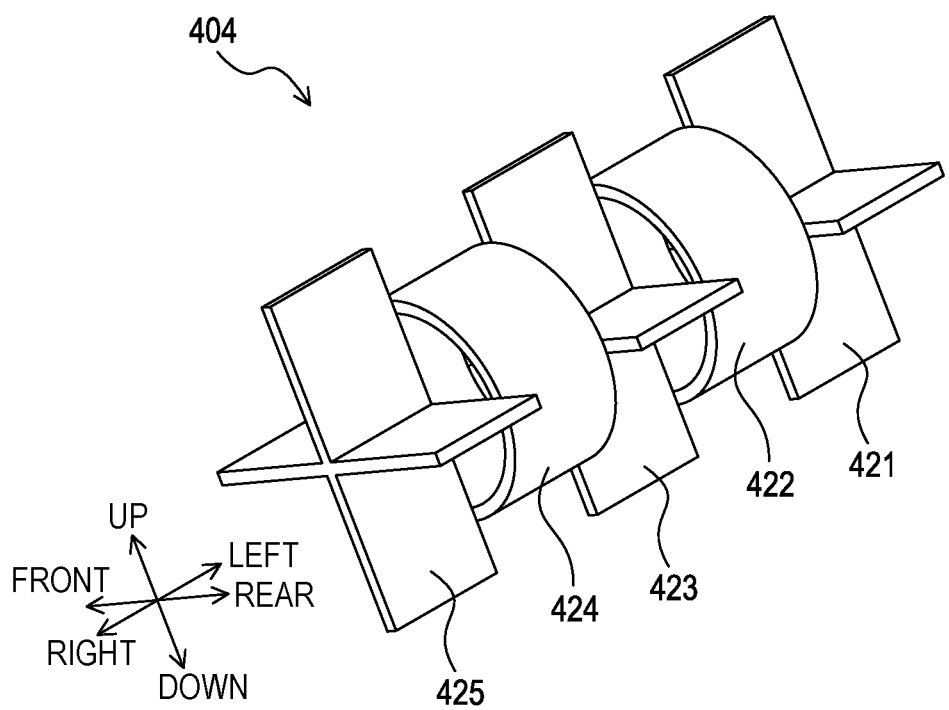
FIG. 14 is a perspective view of an internal structure of the fifth embodiment.

As shown in FIGS. 13 and 14, a canister 401 of the fifth embodiment comprises an internal structure 404 in the space in the filling chamber 3 that is filled with the activated carbon. The internal structure 404 comprises a first internal component 421, a second internal component 422, a third internal component 423, a fourth internal component 424, and a fifth internal component 425.

The first internal component 421, the third internal component 423, and the fifth internal component 425 each comprise a member that has a cross-shaped section in the perpendicular plane and has a width in the flow direction. Furthermore, the second internal component 422 and the fourth internal component 424 each comprise a cylindrical member in which the center axis thereof is parallel to the flow direction. The internal components 421 to 425 are located at respective different positions in the right-left direction, which is the flow direction of the evaporated fuel. As is apparent from FIG. 13, each of the internal components 421 to 425 is positioned not to at least partially overlap in position with its adjacent internal component when projected onto the perpendicular plane. For example, the fourth internal component 424 and the fifth internal component 425 do not overlap in position with each other on the projected plane except for portions where a circular circumference of the fourth internal component 424 and a cross-shaped side of the fifth internal component 425 overlap with each other.

5-2. Effects

According to the fifth embodiment detailed above, the internal structure 404 comprises a configuration corresponding to the internal structure 4 and therefore, the same effects as the above-described effects (1a) to (1d) and (1h) of the first embodiment can be obtained.

6. Sixth Embodiment 6-1. Difference from First Embodiment

As compared to the canister of the first embodiment, a canister of a sixth embodiment is different only in respect of the shape of the internal structure. Therefore, descriptions of common configurations are omitted, and different configurations will be mainly described. The same reference numeral used in the first embodiment denotes the same configuration, and reference should be made to the preceding description.

Figure 15:
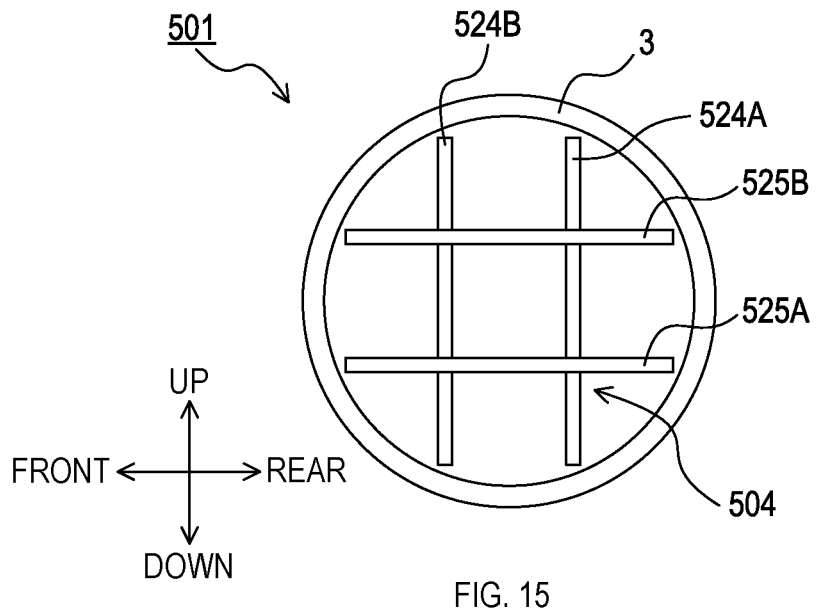
FIG. 15 is a schematic sectional view of a canister of a sixth embodiment.
Figure 16:
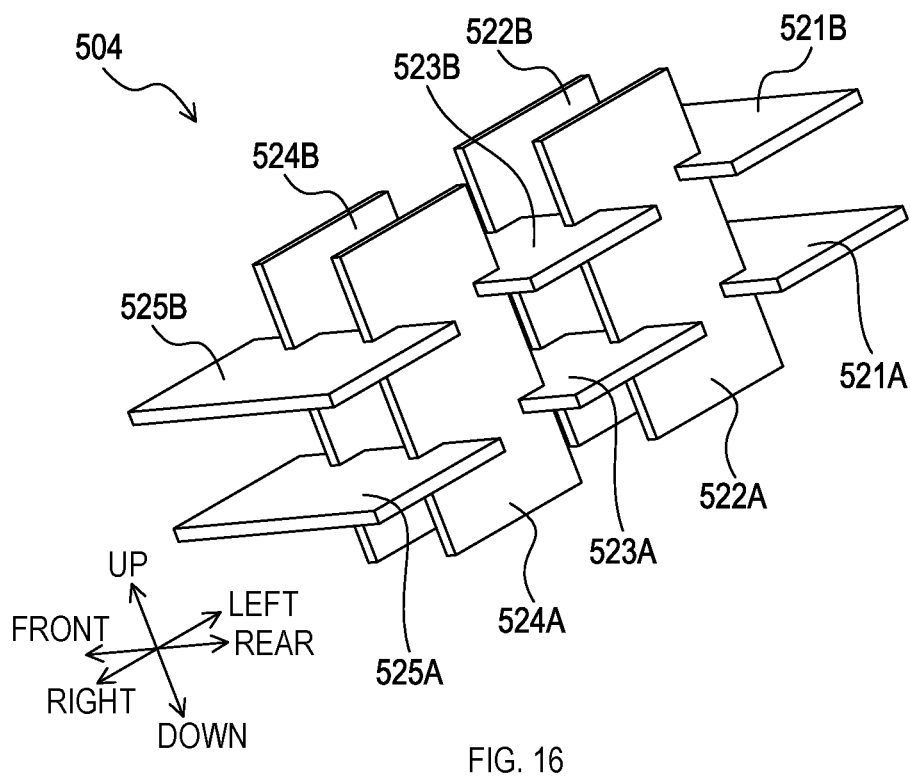
FIG. 16 is a perspective view of an internal structure of the sixth embodiment.

As shown in FIGS. 15 and 16, a canister 501 of the sixth embodiment comprises an internal structure 504 in the space in the filling chamber 3 that is filed with the activated carbon. The internal structure 504 comprises paired plate members, which are parallel to each other, including: an internal component 521A and an internal component 521B; an internal component 522A and an internal component 522B; an internal component 523A and an internal component 523B; an internal component 524A and an internal component 524B; and an internal component 525A and an internal component 525B. Each of the internal components 521A to 525B and its corresponding internal component, which are paired to each other, are located at the same position in the flow direction.

The five paired plate members, which are configured with the internal components 521A to 525B, are located at respective different positions in the right-left direction, which is the flow direction of the evaporated fuel. Furthermore, as is clear from FIG. 15, each of the internal components 521A to 525B are positioned such that at least a portion thereof does not overlap in position with the internal component/internal components adjacent in the right-left direction when projected onto perpendicular plane.

6-2. Effects

According to the sixth embodiment detailed above, the internal structure 504 comprises a configuration corresponding to the internal structure 4 and therefore, the same effects as the above-described effects (1a) to (1d) and (1h) of the first embodiment can be obtained.

7. Seventh Embodiment 7-1. Difference from First Embodiment

As compared to the canister of the first embodiment, a canister of a seventh embodiment is different only in respect of the shape of the internal structure. Therefore, descriptions of common configurations are omitted, and different configurations will be mainly described. The same reference numeral used in the first embodiment denotes the same configuration, and reference should be made to the preceding description.

Figure 17:
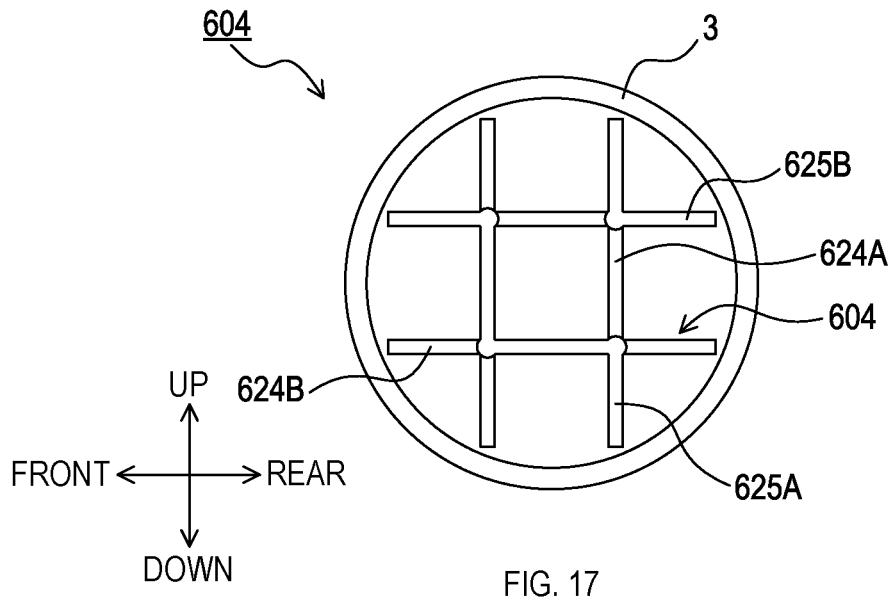
FIG. 17 is a schematic sectional view of a canister of a seventh embodiment.
Figure 18:
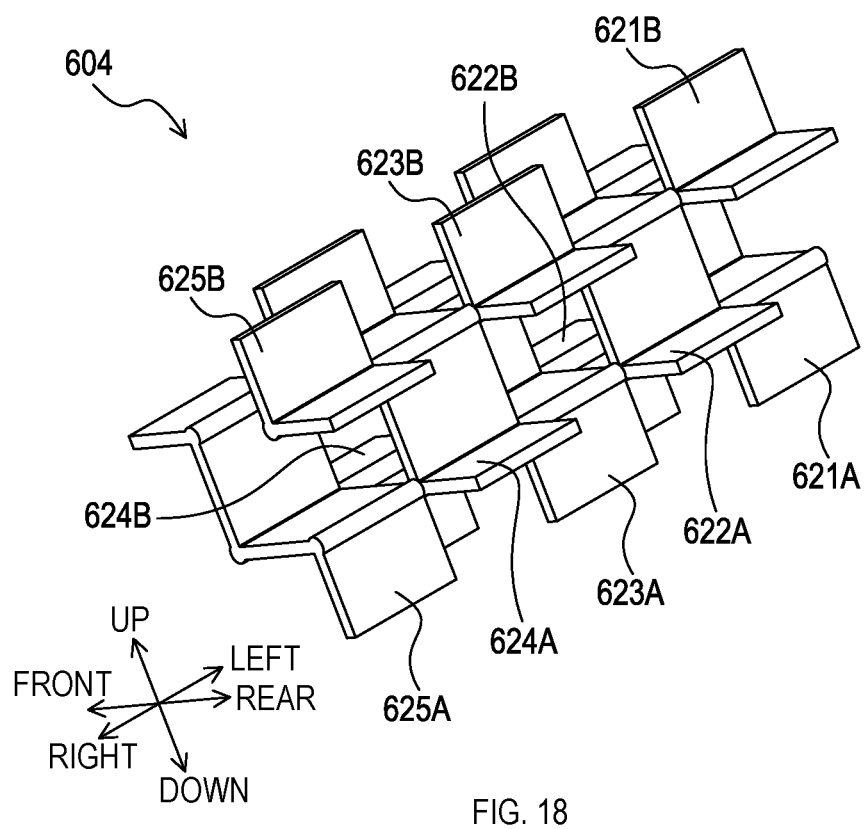
FIG. 18 is a perspective view of an internal structure of the seventh embodiment.

As shown in FIGS. 17 and 18, a canister 601 of the seventh embodiment comprises an internal structure 604 in the space in the filling chamber 3 that is filled with the activated carbon. The internal structure 604 comprises internal components of 621A, 622A, 623A, 624A, and 625A, each of which has a M-shaped section in the perpendicular plane and extends in the flow direction. The internal structure 604 also comprises internal components of 621B, 622B, 623B, 624B, and 625B, each of which has an L-shaped section in the perpendicular plane and extends in the flow direction. The internal component 621A and the internal component 621B are located at the same position in the flow direction. The same positional relation in the flow direction applies to the internal component 622A and the internal component 622B, the internal component 623A and the internal component 623B, the internal component 624A and the internal component 624B, and the internal component 625A and the internal component 625B.

As is apparent from FIG. 17, when the internal components 621A to 625B are projected onto the perpendicular plane, they are in the form of a grid. As shown in FIG. 18, however, each of the internal components 621A to 625B is configured such that no other internal components are arranged in its adjacent area in the flow direction except for its bent portion/bent portions. In other words, the internal components 621A to 625B include at least a combination of two internal components that are located at respective different positions in the right-left direction, which is the flow direction of the evaporated fuel. Furthermore, each of the internal components 621A to 625B is positioned such that at least a portion thereof does not overlap in position with its adjacent internal component/internal components in the right-left direction when projected onto the perpendicular plane.

7-2. Effects

According to the seventh embodiment detailed above, the internal structure 604 comprises a configuration corresponding to the internal structure 4 and therefore, the same effects as the above-described effects (1a) to (1c) and (1h) of the first embodiment can be obtained.

3. Other Embodiments

The embodiments of the present disclosure have been described in the above. However, the present disclosure is not limited to the embodiments described above, and may take various forms within the technical scope of the present disclosure.

(3a) The shape of the internal structure of the present disclosure is not limited to the configuration of each embodiment described above. For example, the internal structure may not necessarily have a symmetric shape. The internal components may be arranged dispersedly in a separation chamber. The shape of each internal component is not particularly limited and may be formed into a bar-shape, a columnar-shape, or a block-shape. Furthermore, the internal structure may not necessarily be configured as an integrated member, and may be configured such that internal components are arranged having a plurality of parts.

Figure 19:
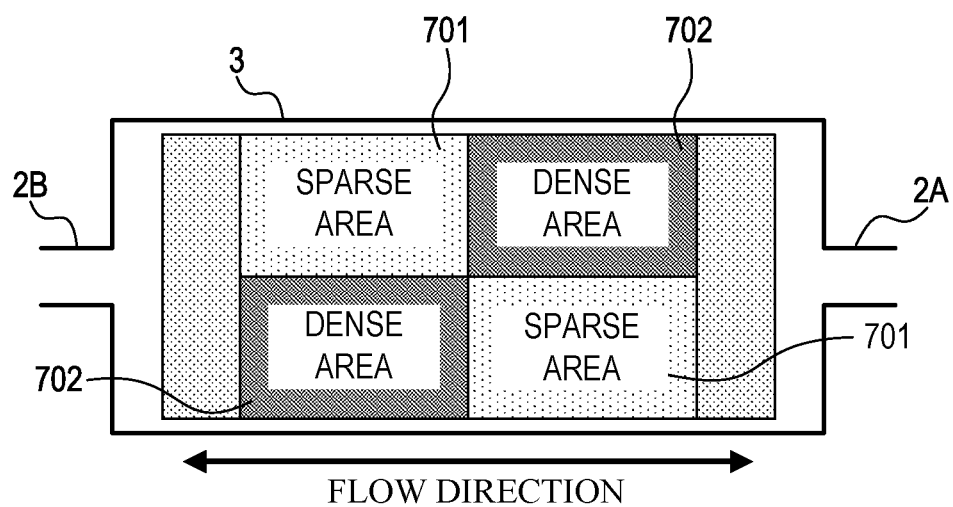
FIG. 19 is an explanatory diagram explaining functions of the present disclosure.

The internal structure may have any configuration in which at least two internal components thereof are a first component and a second component that have the following features. Specifically, the first component is located at a position that is different from a position of the second component in the flow direction of the evaporated fuel in the filling chamber. Furthermore, the first component is positioned such that at least a portion thereof does not overlap in position with the second component when projected onto the plane perpendicular to the flow direction. As a result, as shown in FIG. 19, a sparse area 701 and a dense area 702 are formed along the flow direction. Furthermore, both the sparse area 701 and the dense area 702 area are always present in a specified range in the flow direction. Due to the sparse area 701 and the dense area 702 being arranged in this way, the evaporated fuel flows widely and dispersedly, thus improving the utilization efficiency of the activated carbons.

Figure 20A:
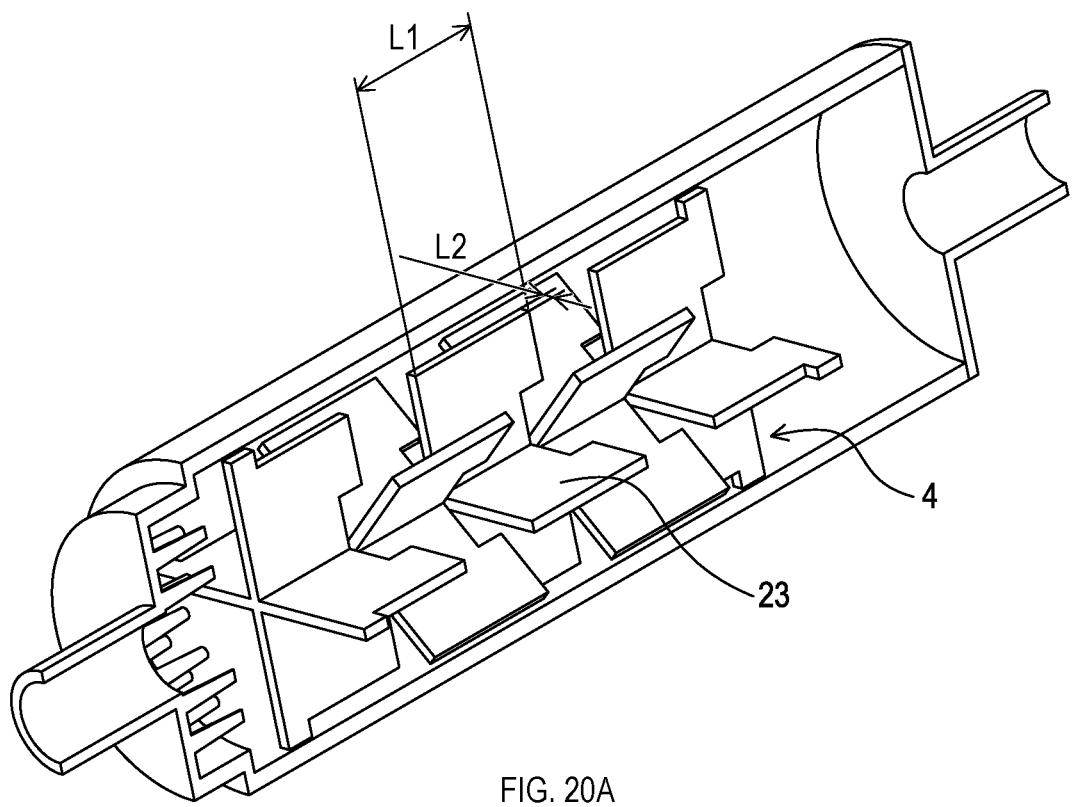
FIG. 20A is a perspective view explaining a definition for a plate-shape in the present disclosure, particularly showing the internal structure of the canister of the first embodiment.
Figure 20B:
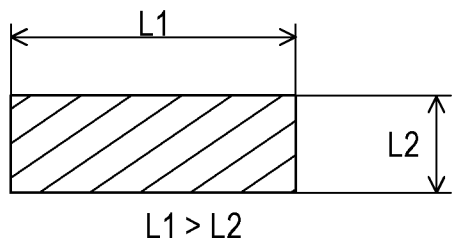
FIG. 20B is a view explaining conditions to be in the plate-shape.
Figure 20C:
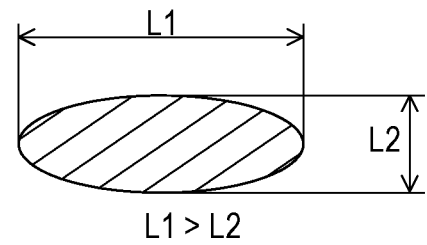
FIG. 20C is a modified example of a plate-shaped member.
Figure 20D:
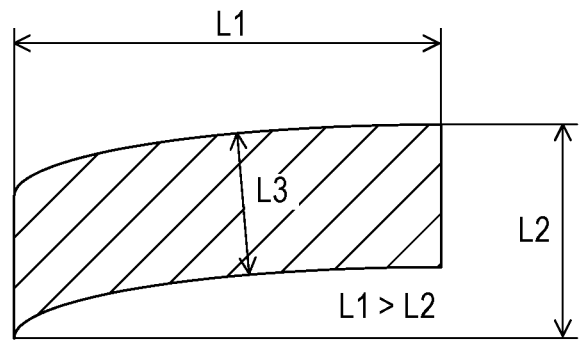
FIG. 20D is a modified example of a plate-shaped member.

The above-described embodiments show example configurations in which the plate-shaped internal components are used. In the present disclosure, the plate-shape can be defined as follows using the third internal component 23 of the canister 1 of the first embodiment shown in FIG. 20A as an example. When a length of the third internal component 23 in the flow direction is defined as L1 and the maximum thickness of the third internal component 23 is defined as L2, the relation between L1 and L2 can be expressed as L1>L2 as shown in FIG. 20B. In this case, the third internal component 23 can be said to have the plate-shape. Accordingly, as shown in FIG. 20C, even if the internal component is configured such that the thickness changes in the flow direction, for example, the internal component is formed such that the thickness is reduced toward both ends thereof, the internal component can be said have the plate-shape. The above-described thickness L2 is a thickness in a direction perpendicular to the flow direction. Therefore, as shown in FIG. 20D, if the internal component is angled with respect to the flow direction, the thickness L2 is larger than the actual thickness L3 of the internal component.

(3b) Each component of the canister of the present disclosure is not limited to the configurations disclosed in the above-described embodiments. For example, the shape of the filling chamber 3, and the respective positions and shapes of the charge port 2A and the atmosphere port 2B are not particularly limited. The filling chamber may be configured into, for example, an L-shape to allow the evaporated fuel to travel having a turn.

(3c) At least two internal components among the internal components may be arranged adjacent to each other in the flow direction. In this case, an adjacent portion is formed as the sparse area, thus reducing the ventilation resistance significantly.

(3d) Functions achieved by a single component in the above embodiments may be distributed to components, and functions achieved by components may be integrated into a single component. Also, a part of a configuration in the above-described embodiments may be omitted. Further, it may be possible to add or substitute at least a part of a configuration in the above-described embodiment to a configuration in other embodiments described above.

What is claimed is:

1. A canister that adsorbs and desorbs an evaporated fuel generated in a fuel tank of a vehicle, the canister comprising:
a filling chamber filled with activated carbon; and
an internal structure arranged in a space in the filling chamber that is filled with the activated carbon, the internal structure comprising:
a first component and a second component,
wherein the first component is located at a position that is different from a position of the second component in a flow direction of the evaporated fuel in the filling chamber, and
wherein the first component is positioned such that at least a portion of the first component does not overlap in position with the second component when viewed along the flow direction.

2. The canister according to claim 1, wherein the first component and the second component each have a plate-shape.

3. The canister according to claim 1, wherein the first component and the second component each include a portion that has a longer length in the flow direction relative to a length in a direction perpendicular to the flow direction.

4. The canister according to claim 1, wherein the first component and the second component each have a cross-shaped section in a plane perpendicular to the flow direction.

5. The canister according to claim 1, wherein at least one of the first component or the second component comprises a restriction that projects toward an inner wall surface forming the filling chamber, to thereby limit a movement range of the internal structure in a direction that intersects the flow direction.

6. The canister according to claim 1, wherein the first component and the second component are configured as an integrated member.

7. The canister according to claim 1, wherein the first component and the second component are arranged adjacent to each other in the flow direction.

8. The canister according to claim 1,
wherein the internal structure further comprises at least one component in addition to the first component and the second component, and
wherein the at least one component is located at a position that is different from the respective positions of the first component and the second component in the flow direction of the evaporated fuel in the filling chamber and is positioned such that at least a portion of the at least one component does not overlap in position with at least one of the first component or the second component when viewed along the flow direction.

\* \* \* \* \*